United States Patent [19]

Macaulay

[11] Patent Number: 5,020,116
[45] Date of Patent: May 28, 1991

[54] IMAGE REGISTRATION METHOD AND APPARATUS

[75] Inventor: Malcolm Macaulay, Fullerton, Calif.

[73] Assignee: Hughes Aircraft Company, Los Angeles, Calif.

[21] Appl. No.: 450,187

[22] Filed: Dec. 13, 1989

[51] Int. Cl.⁵ .............................................. G06K 9/32
[52] U.S. Cl. ...................................... 382/44; 382/44; 358/60; 358/231; 358/236; 358/237
[58] Field of Search ................ 358/60, 139, 236, 237, 358/231; 382/44

[56] References Cited

U.S. PATENT DOCUMENTS

| | | | |
|---|---|---|---|
| 3,033,073 | 5/1962 | Shuttleworth | 382/48 |
| 4,085,425 | 3/1978 | Hamill | 358/231 |
| 4,127,322 | 11/1978 | Jacobson et al. | 358/61 |
| 4,683,467 | 7/1987 | Macaulay et al. | 358/60 |
| 4,684,996 | 8/1987 | Baumeister | 358/231 |
| 4,816,908 | 3/1989 | Colineau et al. | 358/60 |

Primary Examiner—Leo H. Boudreau
Assistant Examiner—Rohini Khanna
Attorney, Agent, or Firm—Wanda K. Denson-Low

[57] ABSTRACT

An image registration system for registering multiple images on a screen is disclosed. A single registration sensor, such as a photodetector, is disposed at an image plane of the system, typically adjacent an edge of the image plane of an image whose position is to be controlled and registered. A sensor mask having a square opening is disposed adjacent the photodetector, and between the image projector and the photodetector. A calibration light pattern is generated, illuminating the entire active area of the photodetector during a calibration time interval. The photodetector output is saved as a calibration value. A vertical test pattern is generated nominally illuminating only one vertical half of the sensor active area, and the sensor output is saved as a vertical pattern value. A horizontal test pattern is generated, nominally illuminating only one horizontal half of the sensor active area, and the sensor output is saved as a horizontal pattern value. The calibration, vertical pattern and horizontal pattern signals are then processed to provide image position correction signals.

16 Claims, 4 Drawing Sheets

PHOTODETECTOR

CALIBRATION PATTERN

VERTICAL POSITION TEST PATTERN

HORIZONTAL POSITION TEST PATTERN

IMAGE REGISTRATION METHOD AND APPARATUS

BACKGROUND OF THE INVENTION

The invention relates generally to image projector systems and more particularly to registration of the images projected from each image projector of the system.

In some systems, an image projected on a screen must have a particular register, i.e., with a reference point or with another image or images projected on the same screen. As an example, where the images of two cathode ray tubes (CRT), each CRT image having a difference color, are to be projected onto a single screen to form a single image having the color combination of both CRT images, the screen registration accuracy requirement for the two images can be very severe in order to avoid undesirable color fringing. The registration accuracy requirement may require registration within one picture element. In some systems where high resolution is required, a registration accuracy requirement of registration within one-fourth of a picture element may exist. For a CRT picture which is four inches in length in one dimension and has one thousand picture elements on that axis, a registration requirement of registration within 0.001 inch may exist.

Since image registration has been affected by component drift due to heat, warm-up times, age, use, etc., some prior techniques invoked sophisticated designs of electrical, optical and mechanical components for stability in view of these factors. Even with these techniques, component drift was not compensated for and registration needed to be readjusted frequently. A further technique was the application of thermostatically controlled heaters to bring all components to a selected temperature which above the ambient temperature. This technique still did not provide the registration accuracy required and the heat had an adverse effect on component reliability.

U.S. Pat. No. 4,683,467, assigned to a common assignee as the present application, discloses an image registration system for registering multiple images on a screen. A registration pattern is projected on the screen along with the image to be registered and in a fixed position in that image. The sensor apparatus for each image, having three photodetectors disposed in a right angle relationship is mounted on the screen at a predetermined location for determining the position of the registration pattern on the screen. The position of the registration pattern on the screen is determined by comparing the outputs of the three photodetectors. Difference signals are produced by the comparisons and are used to reposition the projected image to bring it into registration. The sensor apparatus are disposed so that when the registration patterns are in register with them, the images are in register with each other.

While the system of U.S. Pat. No. 4,683,467 provides a substantial advance over the aforementioned image registration techniques, a disadvantage is the large size of the photodetector assembly required, and the installation problems associated with its mounting and alignment.

SUMMARY OF THE INVENTION

It is the purpose of the invention to overcome the above-described problems and other problems by providing an image registration system which senses the position of the image to be registered on the screen and generates registration control signals in response to the screen sensed position. It is also a purpose to provide registration sensing and adjustments continually, automatically and rapidly.

It is also a purpose of the invention to provide an image registration system which is relatively simple in construction and inexpensive to manufacture.

It is also a purpose of the invention to provide an image registration system which maintains image registration over a wide range of operating conditions, and in particular, an image registration system which is relatively insensitive to wide temperature variation and which compensates for other factors tending to cause lack of image registration.

The foregoing and other purposes are attained by the invention wherein there is provided an image registration system which senses the image position on the screen and provides positional control signals for repositioning the image relative to a screen reference point.

The image registration system comprises a registration sensor disposed at an image plane for the projector system, the sensor characterized by defined active area.

The image projector includes means for projecting an image which illuminates the entire active area of the sensor during a calibration time interval, means for projecting a vertical pattern image which nominally illuminates only one vertical half of the active area of the sensor during a subsequent vertical pattern time interval, and means for projecting a horizontal pattern image which nominally illuminates only one horizontal half of the active area of the sensor during a horizontal pattern time interval.

The system further includes a first means for sampling the output of the sensor during the calibration time interval and holding the output value as a calibration signal value, second means for sampling the output of the sensor during the vertical pattern time interval and holding the output value as a vertical pattern signal value, and third means for sampling the output of the sensor during the horizontal pattern time interval and holding the output value as a horizontal pattern signal value.

The system further comprises means responsive to the respective calibration, vertical pattern and horizontal pattern signals for forming position correction signals to register said image.

The registration sensor comprises a photodetector device having an active area and providing an output signal proportional to the intensity of the light incident on said active area, and a sensor mask having a square-shaped mask opening, and disposed adjacent said sensor with the sensor active area substantially centered on said mask opening, the mask providing a means for defining the active area of said photodetector device.

In a system employing multiple image generators, e.g., for producing a multi-colored image, the system can be used to register the position of images generated by each generator to a screen reference position.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
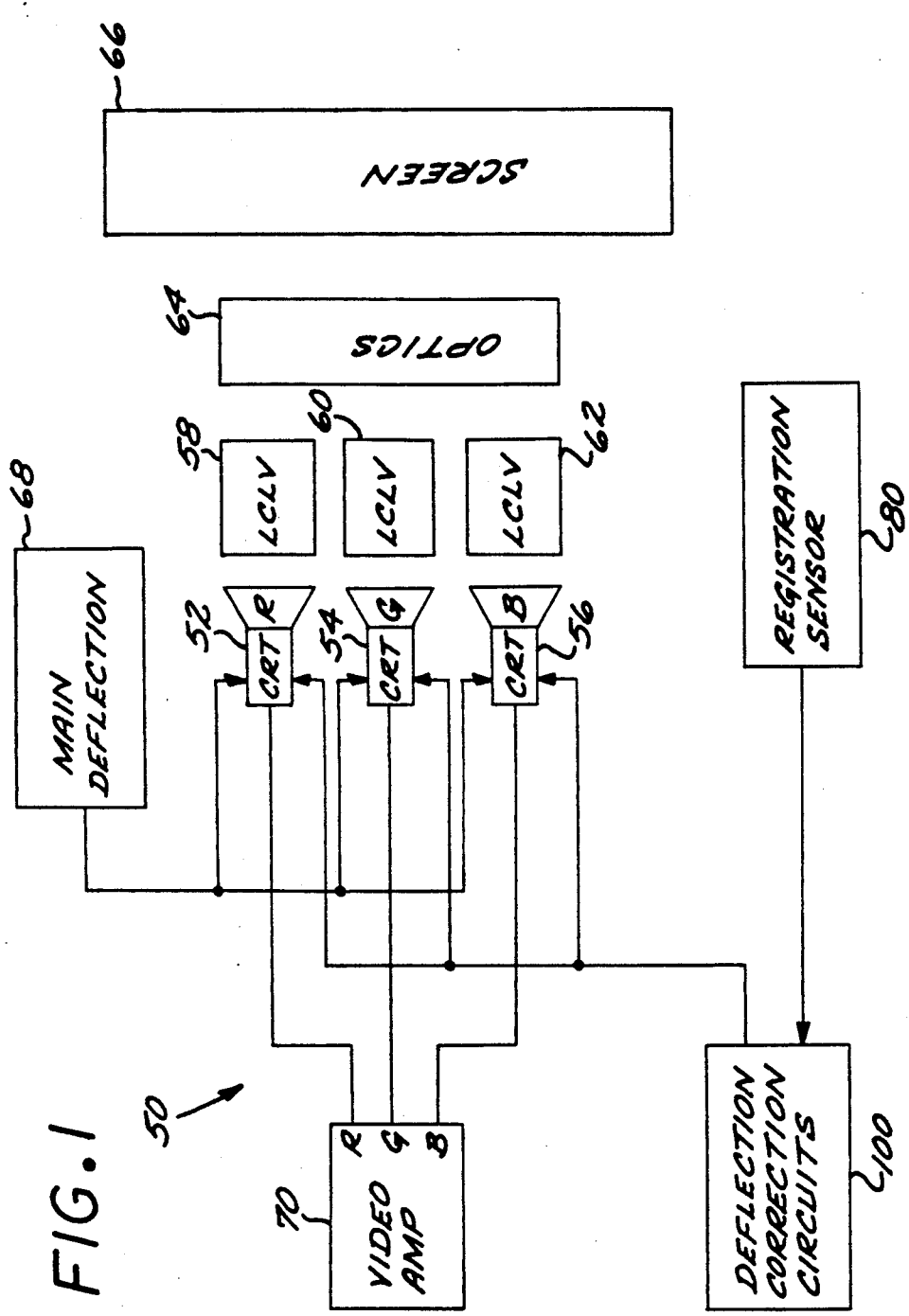
FIG. 1 is a simplified functional block diagram of an image registration system in accordance with the invention.

FIG. 1 shows a simplified functional block diagram of an image registration system 50 in accordance with the invention. In the embodiment of FIG. 1, the images from the red, green and blue cathode ray tubes (CRTs) 52, 54 and 56 are projected onto a common screen 66 via respective liquid crystal light valves 58, 60, 62 and projection optics 64. The LCLV and projection optics apparatus are known in the art, and are not described herein with further specificity. For a reference to an LCLV and lens apparatus, refer to U.S. Pat. No. 4,127,322 to Jacobson et al. The system 50 further comprises the main deflection amplifier circuits 68, which provide the main drive signals to the respective CRT beam deflection coils (not shown in FIG. 1). The video amplifiers 70 provide the video beam intensity control signals for the respective CRTs 52, 54 and 56.

In the apparatus of FIG. 1 the image of CRT 52 has a red color, the image of CRT 54 has a green color, and the image of CRT 56 has a blue color. The combination of the red, green and blue images on the screen 66 forms the desired image. While the present invention is described with respect to a three color display apparatus, the invention is applicable to register the image or images in a single or multicolor system.

The differently colored images from the CRTs 52, 54 and 56 are projected onto the common screen 66. In order to avoid color fringing and to have a clear picture on the screen 66, and to gain the advantage of color mixing of the red, green and blue images, accurate registration of the three images on the screen is required.

Figure 3:
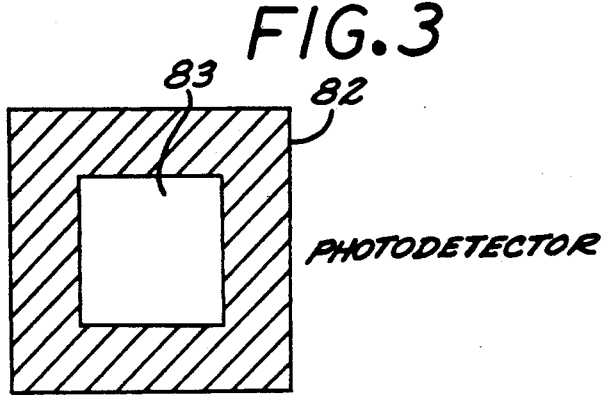
FIG. 3 illustrates a preferred embodiment of the sensor photodetector and mask.
Figure 2:
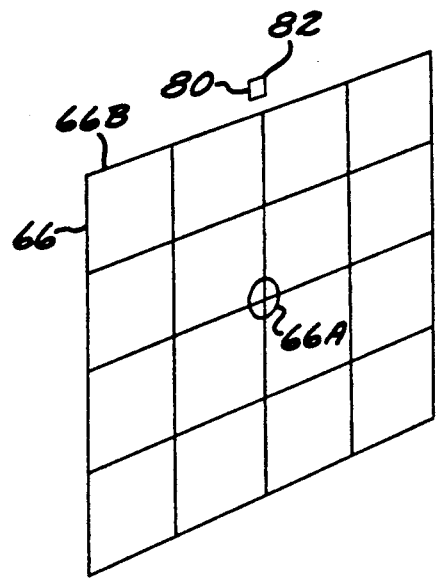
FIG. 2 is a simplified schematic diagram illustrating one configuration of the projection screen and image registration sensor.

Registration of the red, green and blue images on the screen 66 is accomplished by the deflection correction circuitry 100 and the registration sensor 80. The overall operation of the system 50 is illustrated in FIGS. 2 and 3. Here the screen 66 is located at an image plane of the system 50 so that an exemplary image may appear, for example at location 66A. The sensor 80 is located adjacent a vertical edge 66B of the main viewing area on which images are projected by the system 50 and comprises a photodetector. A sensor mask 82 is positioned adjacent the sensor 80 to intercept a portion of the projection light incident on the sensor 80. The mask 82 includes an opening having a square configuration.

Thus, in accordance with the invention a single photodetector 80 is located at the edge of the image plane of the image 66A whose position is to be controlled. The mask 82 defines the area of sensitivity for the photodetector. The photodetector may comprise, for example, a model VT301 device marketed by Vactec, Incorporated, 10900 Page Boulevard, St. Louis, Mo. A mask opening size suitable for this photodetector is, 0.2 inches by 0.2 inches.

Figure 4:
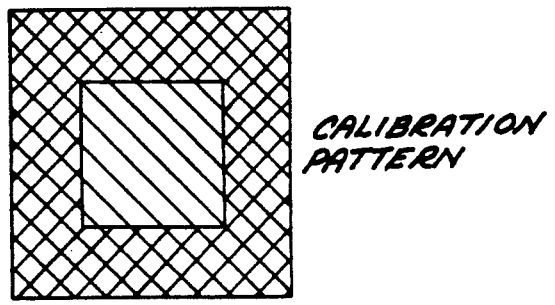
FIGS. 4–6 illustrate the respective calibration, vertical position and horizontal test patterns employed by the image registration system in accordance with the invention.
Figure 5:
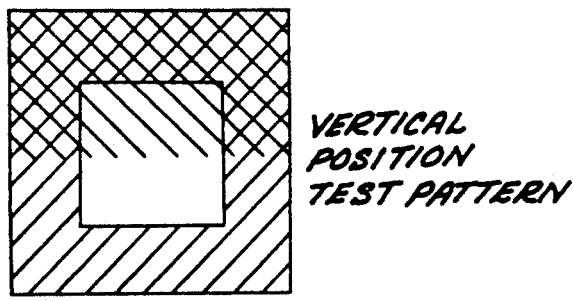
Figure 6:
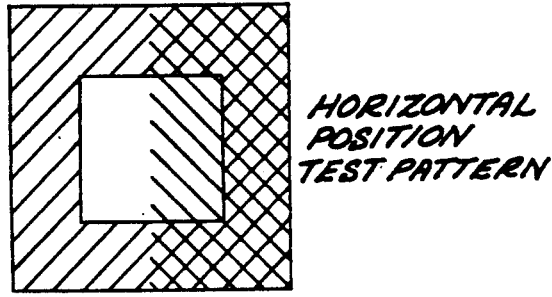

Prescribed light patterns illustrated in FIGS. 4–6 are made to strike the masked photodetector 80 in sequence. The pattern of FIG. 4 (the calibration pattern) fully covers the active area of the photodetector thereby establishing the signal level associated with such coverage. The pattern of FIG. 5 (the vertical position pattern) is shaped so that it covers one-half of the photodetector area when the image is properly positioned in the vertical dimension of the image plane. The pattern FIG. 6 (the horizontal position pattern) is shaped so that it cover one-half of the photodetector area when the image is properly positioned in the horizontal dimension of the image plane. The circuitry 100 associated with the photodetector 80 samples, holds and combines the photodetector signals to develop position correction signals to maintain the image on the face of a CRT to the desired position.

Using a single photodetector as the registration sensor 80 has advantages. If the sensor is located at the screen, installation is made easy and the size of the sensor is not as critical as in the equipment described in U.S. Pat. No. 4,683,467. If the automatic registration means is located internal to the projector, i.e., at an image plane within the projector apparatus, the advantage of a single detector lies in eliminating the need for precise location of several sensor arrays of very small dimension. Since the invention requires no position information from the photosensor 80, relying only on its response to light intensity at a defined target, the light may be relayed from the target area to the photosensor by means of a simple light pipe, e.g., an optical fiber. In other words, the shape of the image need not be preserved at the photosensor, an important attribute in dealing with very small patterns.

Figure 7:
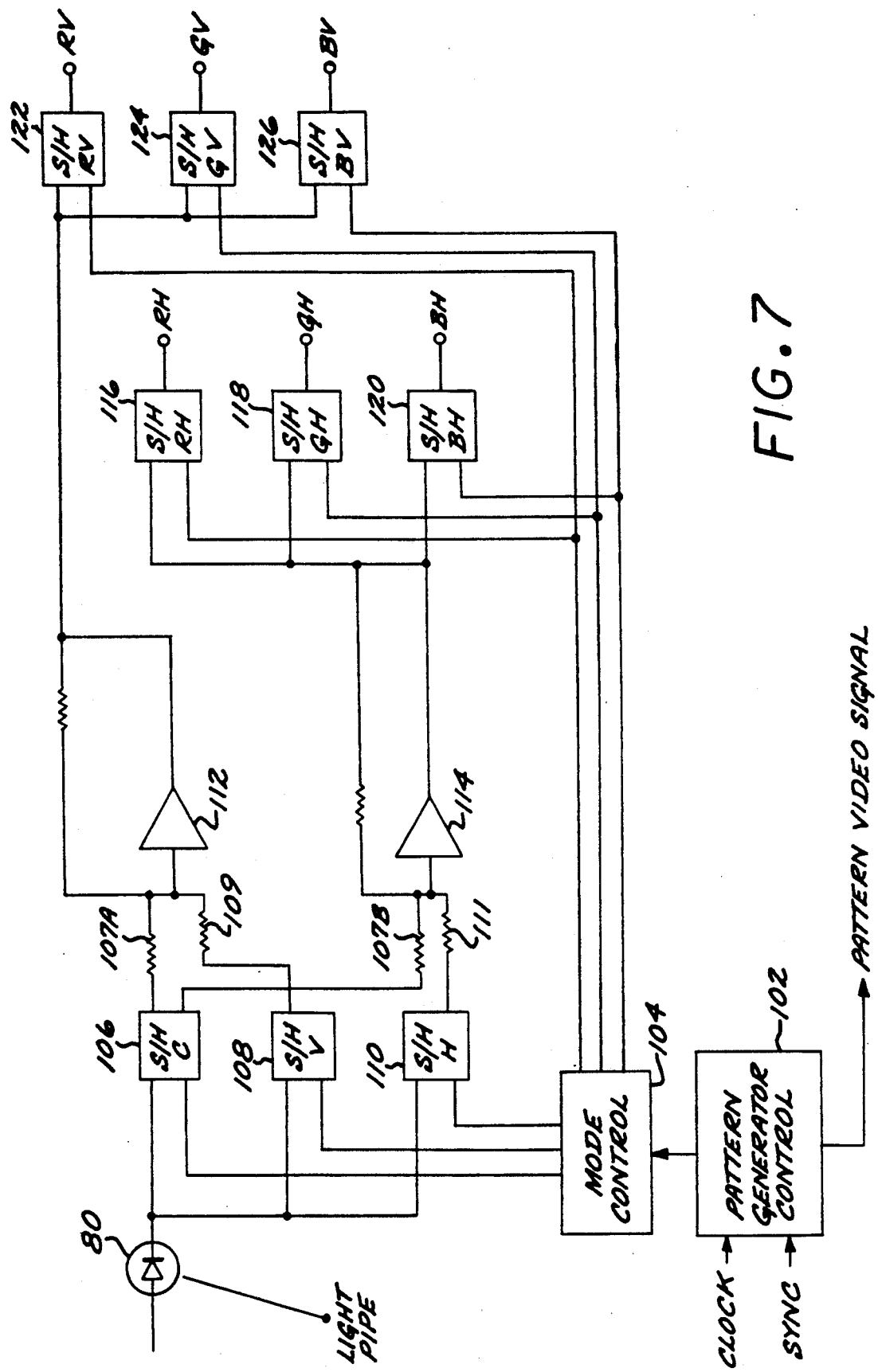
FIGS. 7 and 8 are simplified schematic diagrams illustrative of the deflection correction circuitry of the system of FIG. 1.
Figure 8:
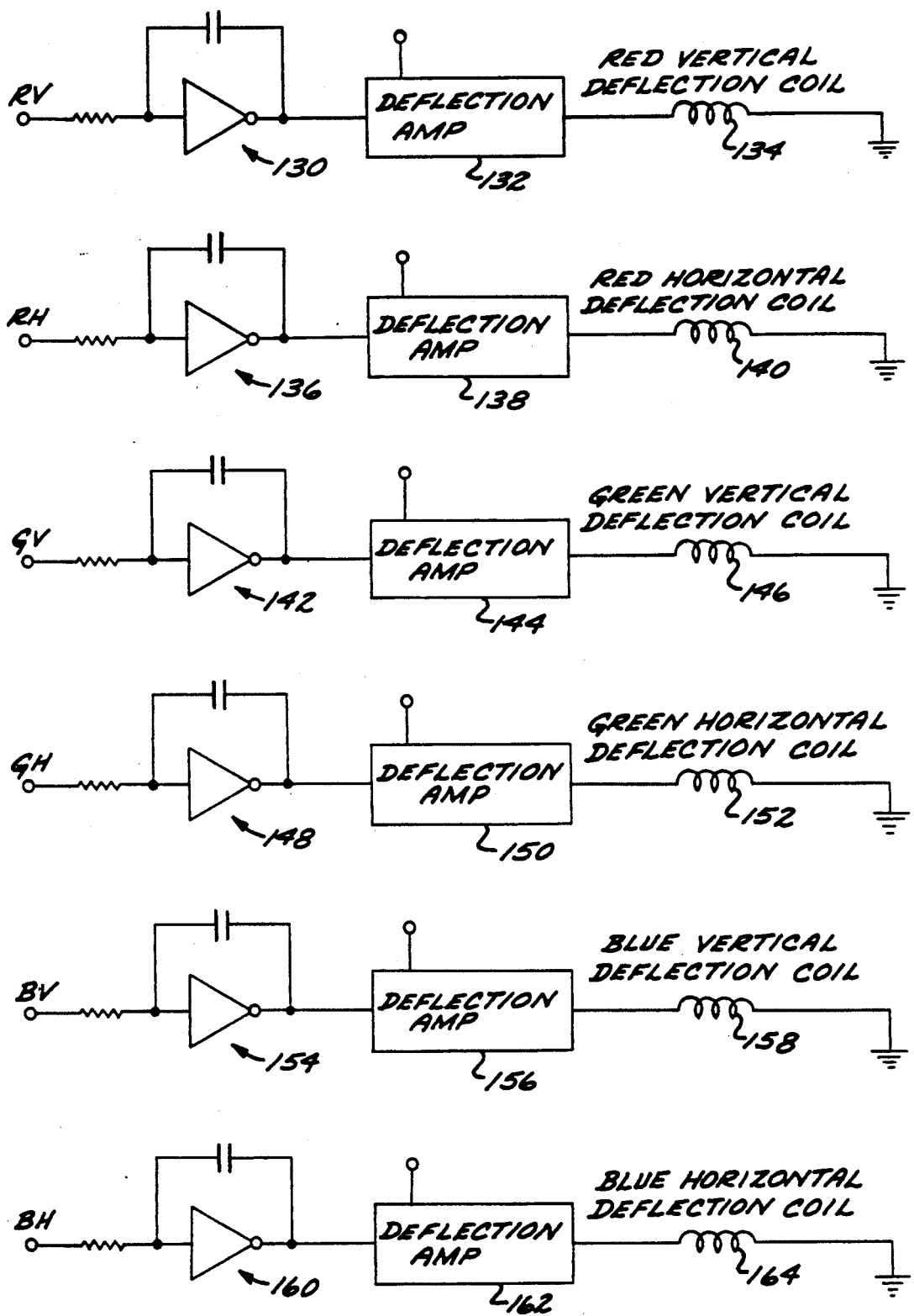

Referring now to FIGS. 7 and 8, the deflection correction circuitry 100 is disclosed in further detail. The circuitry 100 comprises the pattern generator control device 102, responsive to the clock and synchronization signals which are well known in the raster scanned television art, and which generate the pattern video signals employed by the image registration system to generate the pattern images incident on the registration sensor. In the preferred embodiment, the patterns are generated during the vertical interval, using raster lines which are not employed to generate the image 66A. The vertical interval is well known in the television arts. For references, refer to "A history of the Vertical Interval Color Reference Signal (VIR)," C. B. Neal and E. M. Layton, EIA Television Systems Bulletin No. 3, March 1975; and to "EIA Recommended Practice for Use of a Vertical Interval Reference (VIR) Signal," EIA Television Systems Bulletin No. 1, July, 1972. The pattern generator control device 102 further provides control signals to mode controller 104, which in turn provides mode control signals to various elements of the circuitry 100 illustrated in FIG. 7.

The photodetector 80 provides an electrical current output signal which is proportional to the intensity of the light incident on the photodetector 80 active area. The output signal from the photodetector 80 is presented to the input terminals of the sample and hold (S/H) amplifiers 106, 108 and 110. The S/H amplifier 106 is used to sample and hold the photodetector output level during the calibration test pattern shown in FIG. 4, and is controlled by the "calibration S/H control" signal from the mode controller 104. The S/H amplifier 108 is used to sample and hold the photodetector 80 output signal during the vertical test pattern shown in FIG. 5, and is controlled by the "vertical S/H control" signal from the controller 104. The S/H amplifier 110 is used to sample and hold the photodetector 80 output signal during the horizontal test pattern shown in FIG. 6, and is controlled by the "horizontal S/H control" signal from the controller 104.

The circuitry 100 further includes the operational amplifiers 112 and 114. Operational amplifier 112 receives as inputs signals proportional to the held signal values in respective S/H amplifiers 106 and 108, and generates an output signal representing the difference between the calibration pattern light intensity and the vertical pattern light intensity, i.e., a signal that is a measure of the vertical displacement error. Operational amplifier 114 receives as inputs signals proportional to the held values in respective S/H amplifiers 106 and 110, and generates a signal representing the difference between the calibration pattern light intensity, i.e., a signal that is a measure of the horizontal displacement error. The amplitude of the respective held values of amplifiers 108 and 110 is nominally one-half that of amplifier 106 when the respective patterns are properly aligned with the sensor. The values of the resistances 109 and 111 are respectively one-half the value of the resistances 107A and 107B in this embodiment. Thus, the outputs of the amplifiers 112, 114 will be nulled when the respective patterns are properly aligned with the sensor.

The output of the operational amplifier 112 is connected to inputs of the respective red vertical S/H amplifier 122, the green vertical S/H amplifier 124 and the blue vertical S/H amplifier 126. The respective S/H amplifiers 122, 124 and 126 are switched to the sample mode by the respective control signals from the mode controller 104, i.e., the "red correction S/H control" signal, the "green correction S/H control" and the "blue correction S/H control" signal.

The output of the operational amplifier 114 is connected to inputs of the red horizontal S/H amplifier 116, the green horizontal S/H amplifier 118 and the blue horizontal S/H amplifier 120. These amplifiers are respectively switched to the sample mode by the "red correction S/H control" signal, the "green correction S/H control" and the "blue correction S/H control" signal, and perform functions similar to the vertical S/H amplifiers 122, 124 and 126 in relation to the horizontal deflection error signal.

FIG. 8 illustrates additional circuit components comprising the deflection correction circuits 100. The held values (RV, GV, BV, RH, GH and BH) from the respective S/H amplifiers 122, 124, 126, 116, 118 and 120 are input to respective integrator and deflection amplifier circuits to provide the deflection signals to be passed through the respective CRT deflection coils. Thus, signal RV is input to integrator circuit 130, and the integrated output signal drives the deflection amplifier 132 to produce the vertical deflection correction signal through the red CRT (52) vertical deflection coil 134. Signal RH is input to integrator circuit 136, and the integrated output signal drives the deflection amplifier 138 to produce the horizontal deflection correction signal through the red CRT (52) horizontal deflection coil 140.

Signal GV is input to integrator circuit 142, and the integrated output signal drives the deflection amplifier 144 to produce the vertical deflection correction signal through the green CRT (54) vertical deflection coil 146. The signal GH is input to integrator circuit 148, and the integrated output signal drives the deflection amplifier 150 to generate the horizontal deflection correction signal through the green CRT (54) horizontal deflection coil 152.

The signal BV is input to integrator circuit 154, and the integrated output signal drives the deflection amplifier 156 to generate the vertical deflection correction signal through the blue CRT (56) vertical deflection coil 158. The signal BH is input to the integrator circuit 160, and the integrated output signal drives the deflection amplifier 162 to generate the horizontal deflection correction signal through the blue CRT (56) horizontal deflection coil 164.

A typical sequence of events in the registration process includes the following. When the red CRT calibration pattern strikes the photodetector 80, a signal proportional to the intensity of the incident light is presented to the input terminals of the S/H amplifiers 106, 108, 110. At the same time, the calibration S/H amplifier 106 samples the photodetector signal. The calibration S/H amplifier 106 is switched to the hold mode by its control signal when the vertical pattern is displayed. The vertical S/H amplifier 108 is switched to the sample mode at the same time. Immediately thereafter the horizontal pattern is displayed, while the calibration S/H amplifier 106 and vertical S/H amplifier care in the hold mode and the horizontal S/H amplifier 110 is in the sample mode. The last step in this four step sequence (for the red CRT 52) takes place while all three S/H amplifiers 106, 108, 110 are in the hold mode. Operational amplifier 112 generates a vertical displacement error signal representing the difference between the red calibration light intensity and the vertical pattern light intensity. Operational amplifier 114 performs a like function in regard to the horizontal pattern light intensity. The red vertical amplifier 122 and the red horizontal amplifier 116 are each switched to the sample mode, thus providing output signals RV and RH representative of the image drift continuously at the outputs of amplifiers 112 and 116.

The sequence continues in like fashion for the green and blue CRTs 54 and 56. In a typical application in operation with an electronic display projector, the entire sequence of pattern presentation, sampling and holding as described above will take place in one-fifth of a second. Image drift experienced in projectors occurs over much longer time periods; thus, the sampling frequency is not significant. The integration time in amplifiers 130, 136, 142, 148, 154, and 160 is considerably more than one-fifth of a second, e.g., thirty seconds.

The test patterns of FIGS. 4–6 are presented in sequence for each CRT in company with control signals to the sample and hold amplifiers as tabulated in Table I. Each channel employs a four sequence set of events as described above.

TABLE I

|  | \multicolumn{12}{c}{EVENT NUMBER} |
| --- | --- | --- | --- | --- | --- | --- | --- | --- | --- | --- | --- | --- |
|  | Red | | | | Green | | | | Blue | | | |
|  | 1 | 2 | 3 | 4 | 5 | 6 | 7 | 8 | 9 | 10 | 11 | 12 |
| Calibration S/H Amplifier | S | H | H | H | S | H | H | H | S | H | H | H |
| Vertical S/H Amplifier | H | S | H | H | H | S | H | H | H | S | H | H |
| Horizontal S/H Amplifier | H | H | S | H | H | H | S | H | H | H | S | H |
| Red Calibration Pattern | + | − | − | − | − | − | − | − | − | − | − | − |
| Red Vertical Pattern | − | + | − | − | − | − | − | − | − | − | − | − |
| Red Horizontal Pattern | − | − | + | − | − | − | − | − | − | − | − | − |
| Red V Correction S/H Amplifier | H | H | H | S | H | H | H | H | H | H | H | H |
| Red H Correction S/H Amplifier | H | H | H | S | H | H | H | H | H | H | H | H |
| Green Calibration Pattern | − | − | − | − | + | − | − | − | − | − | − | − |
| Green Vertical Pattern | − | − | − | − | − | + | − | − | − | − | − | − |
| Green Horizontal Pattern | − | − | − | − | − | − | + | − | − | − | − | − |
| Green V Correction S/H Ampl. | H | H | H | H | H | H | H | S | H | H | H | H |
| Green H Correction S/H Ampl. | H | H | H | H | H | H | H | S | H | H | H | H |
| Blue Calibration Pattern | − | − | − | − | − | − | − | − | + | − | − | − |
| Blue Vertical Pattern | − | − | − | − | − | − | − | − | − | + | − | − |
| Blue Horizontal Pattern | − | − | − | − | − | − | − | − | − | − | + | − |
| Blue V Correction S/H Ampl. | H | H | H | H | H | H | H | H | H | H | H | S |
| Blue H Correction S/H Ampl. | H | H | H | H | H | H | H | H | H | H | H | S |

In Table I, "H"=Hold, "S"=Sample, "+"=On, and "−"=Off.

As will be readily apparent, proper position of the image will result in no correction signal being generated with no consequent change in the output signal from the integrator. If drift occurs, an error signal will be presented to the respective integrators 130, 136, 142, 148, 154, as appropriate, to cause increases or decreases of the respective deflection current to bring the image to the desired position.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. An image registration system for registering the position of one or more images projected by one or more image projectors, comprising:
   a registration sensor having a single defined active area, said registration sensor further characterized by a photodetector device having an active area and providing an output signal proportional to the intensity of the light incident on said active area, and a sensor mask having a mask opening, said sensor active area substantially centered on said mask opening, said mask providing a means for defining the active area of said photodetector device exposed to light from the image projector;
   means for projecting an image which illuminates the entire active area of said sensor during a calibration time interval;
   first means for sampling the output of said sensor during the calibration time interval and holding the output value as a calibration signal value;
   means for projecting a vertical pattern image which nominally illuminates only one vertical half of said active area of said sensor during a vertical pattern time interval;
   second means for sampling the output of said sensor during the vertical pattern time interval and holding the output value as a vertical pattern signal value;
   means for projecting a horizontal pattern image which nominally illuminates only one horizontal half of said active area of said sensor during a horizontal pattern time interval;
   third means for sampling the output of said sensor during the horizontal pattern time interval and holding the output value as a horizontal pattern signal value; and
   means responsive to the respective calibration, vertical pattern and horizontal pattern signals for forming position correction signals to register said image.

2. The system of claim 1 wherein said mask opening has a substantially square configuration.

3. The system of claim 1 wherein said registration sensor is disposed at an image plane of the image projector.

4. The system of claim 1 wherein said registration sensor receives projector light from an image plane of the image projector.

5. The system of claim 1 wherein image projector comprises a cathode ray tube (CRT) for generating said images to be projected, said CRT comprising X and Y deflection coils for deflecting the CRT beam through a desired path, and wherein said position correction signals comprises respective CRT X and Y deflection correction signals.

6. The system of claim 5 wherein said first, second and third means for sampling and holding comprise, respectively, a calibration sample/hold (S/A) amplifier device operable in respective sample or hold modes as selected by a calibration S/H control signal, a vertical S/H amplifier device operable in respective sample or hold modes as selected by a vertical S/H control signal, and a horizontal S/H control signal operable in respective sample or hold modes as selected by a horizontal S/H control signal.

7. The system of claim 5 wherein said means for forming position correction signal comprises means for generating a vertical error signal indicative of the difference between said calibration signal value and said vertical pattern value, and means for generating a horizontal error signal indicative of the difference between said calibration signal value and said horizontal pattern signal value.

8. The system of claim 7 wherein said means for generating said vertical error signal comprises a first operational amplifier responsive to said calibration signal and said vertical pattern value, and providing as an output said vertical error signal, and said means for generating said horizontal error signal comprises a second operational amplifier responsive to said calibration signal and said horizontal pattern value and providing as an output said horizontal error signal.

9. The system of claim 7 wherein said means for forming position correction signals further comprises first means for integrating said vertical error signal and means for amplifying said integrated vertical error signal to provide a vertical correction signal to be applied to said vertical CRT deflection coil, and second means for integrating said horizontal error signal and means for amplifying said integrated horizontal error signal to provide a horizontal correction signal to be applied to said horizontal CRT deflection coil.

10. In a multi-color image projector system for generating at least two images, one of a first color, the other of a second color, the two images being projected onto a common screen, the combination of the two colored images forming a desired multi-colored image, an image registration system for registering the position of the respective images, comprising:

a registration sensor having a single defined active area, said registration sensor comprising a photodetector device having an active area and providing an output signal proportional to the intensity of the light incident on said active area, and a sensor mask having a mask opening, said sensor active area substantially centered on said mask opening, said mask providing a means for defining the active area of said photodetector device;

first means for sampling the output of said sensor during a calibration time interval and holding the output value as a calibration signal value;

second means for sampling the output of said sensor during a vertical pattern time interval and holding the output value as a vertical pattern signal value;

third means for sampling the output of said sensor during the horizontal pattern time interval and holding the output value as a horizontal pattern signal value;

means for projecting a first color calibration pattern covering the entire active area of said sensor during a first color calibration time interval, a first color vertical half pattern which nominally illuminates only one vertical half of the active are of said sensor during a first color vertical pattern time interval, and a first color horizontal pattern which nominally illuminates only one horizontal half of said active area of said sensor during a horizontal pattern time interval;

means for projecting a second color calibration pattern covering the entire active area of said sensor during a second color calibration time interval, a second color vertical half pattern which nominally illuminates only one vertical half of the active area of said sensor during a second color vertical pattern time interval, and a second color horizontal pattern which nominally illuminates only one horizontal half of the active area of said sensor during a second color horizontal pattern time interval; and first correction means responsive to the respective calibration, vertical pattern and horizontal pattern signals during said first color calibration, vertical pattern and horizontal pattern time intervals for forming first color position correction signals to register said first color image;

second correction means responsive to the respective calibration, vertical pattern and horizontal pattern signals during said second color calibration, vertical pattern and horizontal pattern time intervals for forming second color position correction signals to register said second color image.

11. The system of claim 10 wherein said mask opening has a substantially square configuration.

12. The system of claim 10 wherein said registration sensor is disposed at an image plane of the image projector.

13. The system of claim 10 wherein said registration sensor receives projector light from an image plane of the image projector.

14. The system of claim 10 wherein said image projector comprises a cathode ray tube (CRT) for generating said images to be projected, said CRT comprising X and Y deflection coils for deflecting the CRT beam through a desired path, and wherein said position correction signals comprises respective CRT X and Y deflection correction signals.

15. The system of claim 14 wherein said first, second and third means for sampling and holding comprise, respectively, a calibration sample/hold (S/A) amplifier device operable in respective sample or hold modes as selected by a calibration S/H control signal, a vertical S/H amplifier device operable in respective sample or hold modes as selected by a vertical S/H control signal, and a horizontal S/H amplifier device operable in respective sample or hold modes as selected by a horizontal S/H control signal.

16. In an image projector system including one or more image projectors, each for projecting a respective image, each image having registrations at a predetermined relative location, a method for registering the position of one or more projected images, comprising:

using the projector system to project an image which illuminates the entire active area of a registration sensor positioned at an image plane during a calibration time interval, said sensor being characterized by a single active area;

sampling the output of said sensor during said calibration time interval and storing the output value as a calibration signal value;

using the projector system to project a vertical pattern image which nominally illuminates only one vertical half of said active area of said sensor during a vertical pattern time interval;

sampling the output of said sensor during a vertical pattern time interval and storing the output value as a vertical pattern signal value;

using the projector system to project a horizontal pattern image which nominally illuminates only one horizontal half of the active area of said sensor during a horizontal pattern time interval;

sampling the output of said sensor during the horizontal pattern time interval and storing the output value as a horizontal pattern signal value; and processing the respective calibration, vertical pattern and horizontal pattern signals to form position correction signals to register said image.

* * * * *